Patented Dec. 30, 1952

2,623,849

UNITED STATES PATENT OFFICE 2,623,849

SPENT PICKLE LIQUOR TREATMENT

Harry L. Peterson, Indianapolis, Ind.

No Drawing. Application March 30, 1948,
Serial No. 18,062

8 Claims. (Cl. 210—2)

1

This invention relates to the neutralization of spent pickling liquor.

Industrial and Engineering Chemistry for May 1947, pages 614 and 618, contains a comprehensive survey by Richard D. Hoak of Mellon Institute entitled "Waste pickle liquor." Therein the economics of waste recovery discloses that in general recovery is expensive or difficult, or both, all out of proportion to the by-product remuneration. Therein waste disposal is recited as of solar evaporation, or liming. The latter cost, has been well established as about one cent per gallon, and the resultant fluid is still a contaminant to stream life.

The present invention is directed to the neutralization of spent pickling liquor by a coagulation, floatation, and separation process.

For purposes of exemplification attention will be directed to such a liquor wherein sulphuric acid is used for pickling, although the invention may be used with other acids or combinations thereof.

Since the aforementioned publication most completely discloses the character of the liquor, etc., reference will now be had immediately to the present invention.

Briefly described the present invention is as indicated above, and this may partake of two end or terminal stages and depending upon the amount of treating liquid added to the pickling vat, there will be produced either a curd or a water soluble emulsion of the curd, and this is quite stable so that it can be discharged directly from the pickling vat in liquid form without evidencing the presence of the sulphuric acid and thus not constitute an objectionable industrial waste with respect to stream pollution.

When, however, it is desired to recover from the curd the curd forming material formed as a result of the coagulation step to be described, the curd is surface separated and then treated with sodium or potassium hydroxide. The resultant is the starting or neutralizing liquid, plus water, more particularly the saponified fat portion of the neutralizing agent. The initial cost of the saponified fat as compared to the cost of recovery will determine which process will be found most expedient for the terminal step.

Those skilled in the pickling art can from observation of the product determine when the liquor becomes or arrives at that stage commonly termed "spent liquor." This means that the starting sulphuric acid-water solution at the appropriate temperature, whatever is required for pickling, has had its sulphuric acid content reduced to about one to three percent of acid. The other part of the acid has precipitated as iron sulphate or the other sulphates, and when the vat is subsequently drained these deposits can be disposed of upon a suitable dump.

2

Since purification and drying at present prices, in view of the large amount that is available for recovery, commercially precludes further treatment of the sulphate waste material, the invention herein disclosed is not directed to the recovery of ferrous sulphate.

When the operator determines that the liquor is spent there is then added by volume from 15 to 25 per cent of what might be termed the treating agent. This appears sufficient to neutralize that liquor to pH 7.-8. It is here pointed out that if the lower limits are used, there results the formation of a curd that rises to the top and floats upon the surface of the liquid in the pickling vat. From this surface it may be skimmed off or otherwise removed. If desired, it can be neutralized by the addition of hydroxides, as previously described, for the recovery of the saponified fat material.

Utilization of the higher concentrates, that is from 20 to 25 per cent or even above that, results in the formation of a water soluble emulsion, and this will take place without the formation of the curd and clumping thereof. In other words, there is a coagulation effect, but the curd, as formed, is redissolved to produce this emulsion which can be wasted since the acid has been neutralized.

The treating agent herein employed comprises approximately 10% saponified fat content, approximately 8½% carbonate content, and about 1½% of a chloride or zinc oxide, the latter serving as catalyst. The remainder of this treating agent, that is about 80%, is water and the treating agent appears as a liquid soap. When the desired amount of treating agent is applied to the spent liquor, there results a sulphonation action that expends the acid forming a water soluble emulsion of the mass, and there also results, as far as can be determined, a coagulation reaction that produces a curdy floating froth. The addition of the treating agent will neutralize the spent pickle liquor to a pH of 7.-8. The percentage of treating agent, as stated, determines whether the froth is emulsifiable or collects and floats on top of the tank or vat liquid and from which it may be subsequently skimmed and wasted or rejuvenated.

To be more specific the chlorides which have been used as a catalyst are those of sodium and potassium alone or in combination however, zinc oxide is the best so far as now known. The saponified fat has a pH value anywhere from 8 to 14, and it appears that the best results are obtained with a saponified fat having a pH value between 10.5 and 12.

With respect to the carbonates, sodium, potassium, and ammonium alone or in combination can be employed and the same have been found satisfactory. With respect to the saponified fats it is to be observed that they are of low titer and any saponified oil in the fatty acid state and of low titer so far has been determined to be acceptable, although this generalization is not a positive assertion that each and every low titer saponifiable oil in the fatty acid state for oil which is naturally or synthetically hydrogenated will actually function. For example, oleic acid in the for mof red oil, tall oil, olive oil, and cocoanut oil are given as representative of the oils which have been successfully employed.

It has been experimentally determined that at the present cost of material the cost of neutralizing the spent pickle liquor with the present process, excluding the saponified fat rejuvenation step, is about half the cost of neutralizing spent pickle liquor by the liming process.

In addition to the costs that have been herein named, the present process has an additional advantage over and above the liming neutralization process because the addition of lime cannot be made in the pickling vat, but must take place in some other location; whereas, the present process permits the neutralization to take place in the pickling vat itself leaving no contaminant therein for subsequently supplied pickling liquor, provided the spent neutralized liquor is wasted in the customary manner as a sanitary effluent and the precipitated sulphates are removed mechanically. The vat or tank accordingly need not even be washed down although that would be the preferred preliminary step to refilling with pickling liquor.

As initially indicated herein the present process can be employed with pickling liquors employing other acids than sulphric acid; for example, nitric and hydrochloric are used, and mixtures thereof with sulphuric acid are also used for the pickling of stainless steel. It is now the practice to use hydrofluoric acid. In cases where hydrochloric acid only is the active acid in the pickling liquor, the chloride catalyst herein mentioned may be omitted, but it need not be omitted, and the treating agent as described including zinc oxide may be used. But in mixtures of the acids and with any other than hydrochloric acid constituting the sole acid in pickling liquor, the zinc oxide catalyst, as presently determined, seems to give the best results.

While the invention has been described in great detail herein same is to be considered illustrative only. The modifications described, as well as others which will readily suggest themselves to persons skilled in this art are all considered to be within the scope of the present invention as defined by the following claims.

The invention claimed is:

1. A method of treating spent ferrous metal pickling liquor containing mineral acids which consists in neutralizing the mineral acids and precipitating the metallic oxides therein by introducing into the spent liquor a neutralizing treating agent having a saponified fat content and an alkali content in a quantity sufficient to effect a curd formation and removing the curd.

2. A method of treating spent ferrous metal pickling liquor containing sulphuric acid which consists in neutralizing the sulphuric acid and precipitating the metallic oxides therein by introducing into the spent liquor a neutralizing agent having a saponified fat content and an alkali content in a quantity sufficient to effect a curd formation and removing the curd.

3. The method of treating spent ferrous metal pickling liquor containing mineral acids which consists in neutralizing the mineral acids and precipitating the metallic oxides therein by introducing into the spent liquor a neutralizing agent having a saponified fat content, an alkali content and a catalyst in a quantity sufficient to effect a curd formation and removing the curd.

4. The method of treating spent ferrous metal pickling liquor containing mineral acids which consists in neutralizing the mineral acids and precipitating the metallic oxides therein by introducing into the spent liquor a neutralizing agent having a saponified fat content, an alkali content and a chloride in sufficient quantity to effect a curd formation and removing the curd.

5. The method of treating spent ferrous metal pickling liquor containing sulphuric acid which consists in neutralizing the sulphuric acid and precipitating the metallic oxides therein by introducing into said spent liquor a neutralizing agent containing oleic acid, and an alkali content in a quantity sufficient to effect curd formation and removing the curd.

6. The method of treating spent ferrous metal pickling liquor containing mineral acids which consists in neutralizing the mineral acids and precipitating the metallic oxides therein by introducing into said liquor a neutralizing agent containing saponified fat, a carbonate and a catalyst in sufficient quantity to effect curd formation and removing the curd.

7. The method of treating spent ferrous metal pickling liquor containing mineral acids which consists in neutralizing the mineral acids and precipitating the metallic oxides therein by introducing into the said liquor a neutralizing agent containing one of the following group: red oil, tall oil, and coconut oil, and one of the following group: ammonia, sodium and potassium to effect curd formation and removing the curd.

8. The method of treating spent ferrous metal pickling liquor containing mineral acids which consists in neutralizing the mineral acids and precipitating the metallic oxides therein by introducing into said liquor a neutralizing agent containing one of the following group: red oil, tall oil, and coconut oil, and one of the following group, ammonia, sodium, potassium, and zinc oxide to effect curd formation and removing the curd.

HARRY L. PETERSON.

REFERENCES CITED

The following references are of record in the file of this patent:

UNITED STATES PATENTS

| Number | Name | Date |
|---|---|---|
| 777,274 | Cattermole | Dec. 13, 1904 |
| 1,793,342 | Travers | Feb. 17, 1931 |
| 1,829,522 | Kern et al. | Oct. 27, 1931 |
| 2,419,945 | Clemmer et al. | May 6, 1947 |

FOREIGN PATENTS

| Number | Country | Date |
|---|---|---|
| 24,842 | Great Britain | Nov. 18, 1908 |
| 220,849 | Great Britain | Aug. 28, 1924 |
| 299,919 | Great Britain | Nov. 8, 1928 |

OTHER REFERENCES

Bureau of Mines Report, May 1938, R. I. 3397, page 17.